United States Patent [19]

Skupien et al.

[11] Patent Number: 5,730,557

[45] Date of Patent: Mar. 24, 1998

[54] MORTAR MIXTURE UNIT FOR CHEMICAL ATTACHMENT OF ANCHORING MEANS IN BOREHOLES

[75] Inventors: Roman Skupien, Schwabmünchen; Frich Leibhard, Munich; Lutz Achim Sager, Landsberg, all of Germany

[73] Assignee: Hilti Aktiengesellschaft, Schaan, Liechtenstein

[21] Appl. No.: 618,694

[22] Filed: Mar. 20, 1996

[30] Foreign Application Priority Data

Mar. 21, 1995 [DE] Germany .................. 195 10 307.6

[51] Int. Cl.$^6$ .................. E21D 20/02; B65D 25/08; B65D 77/06
[52] U.S. Cl. .................. 405/259.6; 206/219
[58] Field of Search .................. 405/259.6, 259.5; 52/704; 206/219

[56] References Cited

U.S. PATENT DOCUMENTS

| | | |
|---|---|---|
| 3,699,687 | 10/1972 | Bourland .................. 405/259.6 |
| 3,892,101 | 7/1975 | Gruber .................. 405/259.6 |
| 4,007,831 | 2/1977 | Bernhardt .................. 405/259.6 X |
| 4,009,778 | 3/1977 | Howell .................. 405/259.6 X |
| 4,023,373 | 5/1977 | Hipkins .................. 405/259.6 |
| 4,103,771 | 8/1978 | Klatt et al. .................. 405/259.6 X |
| 4,227,612 | 10/1980 | Dillion .................. 405/259.6 X |
| 4,279,340 | 7/1981 | Lang .................. 405/259.6 X |

*Primary Examiner*—Dennis L. Taylor
*Attorney, Agent, or Firm*—Anderson, Kill & Olick, P.C.

[57] ABSTRACT

A mortar mixture unit (1) for chemical attachment of anchoring means or members in boreholes includes an essentially cylindrical external cartridge (2), which can be destroyed when inserting the anchoring member into a borehole containing a cartridge. The cartridge (7) contains individual ingredients of a multi-component mortar including a binder means system (6, 8) and filling agents (7). The cartridge (2) is formed of a flexible material having a volume share amounting to less than 15% of the total volume of the mortar mixture unit (1), the volume share of the binder means system (6, 8) amounts to approximately 50% to 60% of the total volume of the mortar mixture unit (1) and the volume share of the filling agents (7) amounts to approximately 35% to 70% of the total volume of the mortar mixture unit (1).

10 Claims, 2 Drawing Sheets

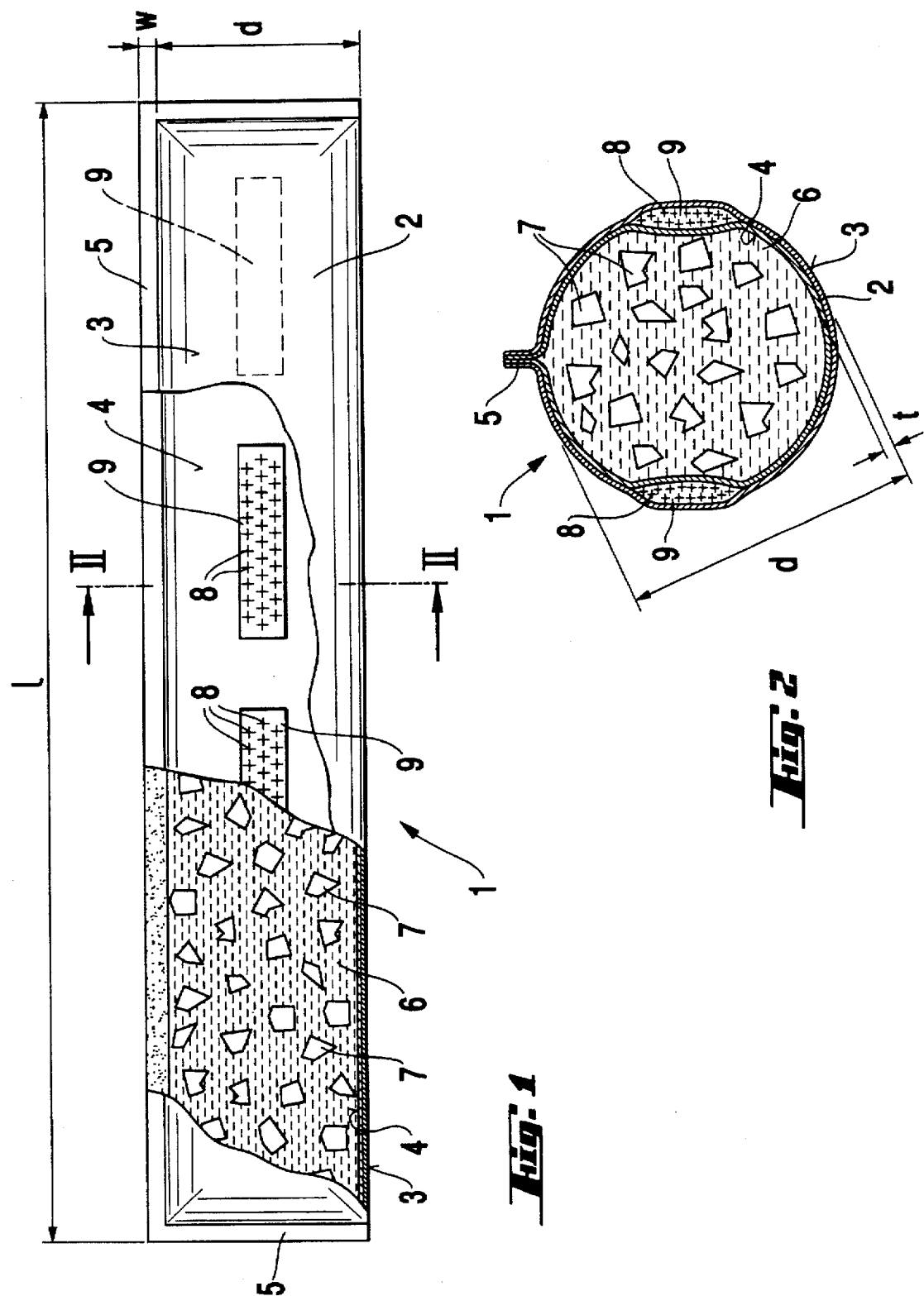

MORTAR MIXTURE UNIT FOR CHEMICAL ATTACHMENT OF ANCHORING MEANS IN BOREHOLES

FIELD OF INVENTION

The invention deals with a mortar mixture unit for chemical attachment of anchoring means in boreholes comprising essentially a cylindrical external cartridge, which can be destroyed in the course of setting the anchoring means as well as comprising the individual components of a multi-component mortar including binders and fillers, disposed inside the cartridge.

BACKGROUND INFORMATION AND THE PRIOR ART

Chemical fastening technologies are mainly used in the mining industry, in tunnel construction, for special attachments when laying rail traffic-tracks, for corrosion endangered applications in moisture-soaked subsoils, for anchoring heavy loads and many other applications. The chemical attachment technology permits building attachments without expansion pressure but with a high-load carrying capacity. For fastening anchoring means, as for instance anchoring rods, sleeves with an internal thread or concrete reinforcing irons in rock or concrete, cartridges are generally used, which comprise two or more chambers for separate storage of components of a multi-component mortar. The multi-component mortar comprises as a rule an organic or inorganic binder or a mixture of the two binders, as well as filling agents, which fulfill a support and strengthening function in the cured or hardened mortar, thus imparting the required strength to it. The cartridge is inserted into a borehole and the cartridge or the chambers of the cartridge are destroyed by a rotary-blow type placement of the anchoring means. Herein the reaction components of the multi-component mortar are inter-mixed and the curing or hardening reaction is initiated. The cured or hardened multi-component mortar enables the introduction of the load into the subsoil without having to use expansion pressure. Such composite anchors have been used in the past, mainly for anchoring heavy loads.

Various embodiment versions of cartridges of mortar mixture are described in the EP-B-0150555, which comprise two chambers separated from one another, housing a binder consisting of an epoxy acrylic resin and a hardener. The mortar mixture can additionally contain, up to five times by weight of the binder, coarse and fine fillers. The mortar mixture unit comprises an external glass cartridge, inside which a second inner glass container is housed. In the course of rotary blow placement of the anchoring means, the glass cartridges are destroyed and more or less ground up. The fragments of the glass form a component of the fillers and are meant to strengthen the cured or hardened resin in order to impart the required strength to it. To be sure, it cannot be anticipated to what extent the glass will be comminuted when the anchoring means are introduced. The size of the glass fragments differs from attachment point to attachment point. Sometimes the glass is broken up into relatively large fragments, at other times it is ground up into very fine particles. This differing size of the glass fragments has, however, a direct effect upon the strength of the mortar. The load-carrying capacity of the anchoring differs from attachment point to attachment point and can no longer be satisfactorily controlled.

When the anchoring means are introduced, setting resistance of different magnitude is encountered due to the fact that the glass vessels are comminuted into fragments of different sizes at the individual attachment points. The setting resistance defines how rapidly an anchoring means, for instance an anchor rod, can be placed into a borehole. Taking into account that the inter mixture of the reaction components of the binder, for example, of a reactive resin and a hardener is performed by the blow-rotated anchor rod, it can be easily seen that too rapid an introduction of the anchor rod into the borehole intermixes the reaction components of the binder only inadequately. Therefore, the reactive resin only hardens or cures incompletely and the anchoring does not achieve the required load carrying capacity. Due to the inadequate intermixture, the filling materials are not distributed uniformly in the binder means, which impairs the strength of the cured or hardened synthetic resin and which can diminish the load carrying capacity of the anchoring even more. On the other hand, it is desired by the users that the placement of the anchoring means into the boreholes occurs as rapidly as possible and always consumes approximately the same time period from one attachment point to another attachment point.

The glass vessels of the known mortar mixtures are quite fragile and therefore must be packed very carefully in order to prevent vessel breakage in storage and must be handled very carefully to prevent imperilment as well as unpleasant contaminations. If the inner glass cartridge breaks, the synthetic resin and the hardener come into contact and the hardening reaction is triggered unintentionally. Usually glass cartridges are stored in a largely shock proof cardboard package. If one of the glass cartridges is completely destroyed in the package and the hardening reaction is triggered, the entire content of the package must be discarded. It is indeed proposed in the EP-B-O 150 555 to use plastics material bag instead of the internal glass vessel, with the inner glass vessel being disposed in said bag. However, the inner glass vessel can still be unintentionally destroyed wherein the two reaction components of the binder come into contact with one another and the hardening reaction is thus triggered. It can also happen that the fragments of the broken inner glass vessel destroy the bag and that the reaction components, for instance the resin as the hardener escape and pour over other mortar mixtures stored for instance in a cardboard container and cause curing, thus making the entire contents of the cardboard box unusable. The behavior of the plastic bag in the course of the rotary blow placement of the anchoring means is not described with particularity in the publication. It must however be considered that the contact of the plastic bag with the borehole wall results in an attachment, which could only carry reduced loads and which, as a rule, is unacceptable to the user.

Various embodiment variants of a mortar mixture unit are known from the U.S. Pat. No. 3,474,898, comprising a hose-shaped bag of plastics coated metal foils comprising two or more chambers. The chambers are preferably produced by sealing the bag. The sealing seams can be broken open by kneading the hose-shaped bag, so that the synthetic resin and a hardener, which were previously separated, can be mixed. After the bag has been sufficiently kneaded by hand, it can be inserted into a borehole. An anchoring means, for example, an anchor rod, is subsequently pushed into the borehole, wherein the bag bursts open. The synthetic resin-hardener mixture is pressed out of the bag in the course of axial insertion of the anchor rod into the borehole. The bag continues to be pushed further down into the borehole and is collapsed at the base of the borehole. In these known hose bag packages, the binder means, which consists of a synthetic resin and a hardener, is only inadequately inter-mixed by manual kneading. Therefore only an incomplete hardening or curing of the binder means can occur, which reduces the load carrying capacity of the anchoring. The form of the mortar mixture is greatly changed by kneading, which can lead to difficulties when pushing the hose into the borehole. The borehole must be drilled to be relatively deep, since it must also receive the collapsed hose bag at the borehole base. It could also happen that the hose bag is incompletely upset whereby a portion of the hose bag is jammed between the borehole wall and the anchoring means. These regions then no longer assist in the load carrying capacity of the anchoring and the required extraction values can no longer be achieved.

Therefore, it is the task of the present invention to create a mortar mixture unit for chemical fastening technology of anchoring means, which assure as good as possible a connection between the anchoring means to be attached and the borehole wall. The destructible container, where the individual components of the multi-component mortar are stored, is to have no disadvantageous effect upon the load carrying ability or strength of the attachment. The container is to be sufficiently comminuted during the rotary blow introduction of the anchoring means and must, as uniformly as possible, be distributed in the multi-component mortar. The reaction components of the binder means are not to react with one another during storage of the mixture and must be intermixed as homogeneously as possible during introduction of the anchoring means, in order to assure a uniform curing or hardening of the mortar. The fillers are to assume a uniform, supportive and/or reinforcing function in the hardened mortar across the entire depth of the borehole. The fillers essentially determining the strength of the mortar are to be controlled regarding their particle size and particle condition. The setting speed of the anchoring member must be essentially predeterminable and is to be essentially equal from one attachment point to the other. The mortar mixture is to permit simple storage, and therefore it must be able to be handled in a simple manner and in particular must be easily insertable into a borehole. It should be insensitive to shocks, and the hardening reaction of the mortar is not to be triggered even if the canister is accidentally dropped.

OBJECT OF THE INVENTION

An object of the present invention is a mortar mixture unit for chemically attaching an anchoring means in a borehole.

The solution of these tasks consists of a mortar mixture unit for chemical attachment of anchoring means in boreholes, which includes an essentially cylindrical external cartridge which is destructible upon setting of the anchoring means as well as containing the individual components of a multi-component mortar consisting of a binder means and filling materials disposed inside the cartridge.

The cartridge consists of flexible material, whose volume share amounts to less than 15% of the total volume of the mortar mixture, wherein the volume share of the binder means amounts to approximately 15% to approximately 60% and that of the filler materials approximately 35% to approximately 70% of the total volume of the mortar mixture. Flexible materials of the cartridge assures a good handling of the mortar mixture. The cartridge is sufficiently stable to reliably retain the binder means and the filling materials in storage, without taking any special precautions. It is substantially insensitive to shocks and does not break, even if it is accidentally dropped to the floor. In spite of this, the cartridge is destructible and comminutable in the course of the rotary blow-type placement of an anchoring means, for instance an anchor rod, an internally threaded sleeve or a concrete reinforcing iron. Herein the low volume share of the material of the cartridge of less than 15% of the overall volume of the mortar mixture unit, assures that the comminuted cartridge does not have a negative effect upon the load carrying ability of the anchoring. The volume share of the binder agent amounts to approximately 15% to approximately 60% and that of the filling material approximately 35% to approximately 70% of the total volume of the mortar mixture unit.

Due to the selected volume relationships, a sufficiently high setting resistance during the rotary blow-type placement of the anchoring means is assured. The properties and conditions of the filling agent can be predetermined, the comminuted cartridge itself is not a component of the filling material. Thereby the resistance to setting can be controlled in a targeted manner in order to achieve a very thorough intermixture of the individual components of the multi-component mortar, in particular of the reaction components of the binder means. The very thorough intermixture together with the only slight volume share of the flexible and destructible material of the cartridge ensures that the components of the cartridge are quite uniformly distributed in the mortar. Since the properties and the conditions of the entire filling agent can be essentially predetermined in advance, said filling agent can also be matched to the properties of the material of the cartridge, for instance, in order to assist in the comminution of same during the rotary blow type placement of the anchoring means. The entire filling material can be matched to the binder means used, and can be selected in a manner targeted to the desired strength of the cured or hardened mortar. In this way it is possible to assure a thorough connection between the anchoring means to be attached and the borehole wall.

Coarsely dispersed materials are preferably selected as filling agents, which are largely inert relative to binder agents and have a hardness on the Mohs scale of more than 4 and a density of more than or equal to 2 $g/cm^3$. These materials have an adequate inherent stability, in order not to be ground up in the course of the rotary blow type placement of the anchoring means. They impart the desired strength to the cured or hardened multi-component mortar by their uniform intermixture in the matrix of the binder agent. Preferably they have a granular and angular particle shape. At least 80% by weight of the particles have an equivalent diameter amounting to approximately 5% to approximately 25% of the external diameter of the mortar mixture.

The granular, angular particle shape assists in the comminution of the material of the cartridge when the anchoring means is placed in a rotary blow-type placement into the borehole. The targeted selection of the particles of a relatively small equivalent diameter distribution and a specific density permits controlling the setting resistance and the distribution of the particles in the multi-component mortar. In this way the strength of the cured or hardened mortar can be fixed within relatively tight limits, and the desired load carrying ability of the anchoring can be attained. The diameter of a ball or sphere of equivalent volume is herein viewed as the equivalent diameter of an irregularly shaped filling material particle.

The wall thickness of the cartridge amounts to approximately 0.1% to approximately 3% of the external diameter of the mortar mixture. Herein the material of the container is a foil having a rupture elongation of less than 300% of the original foil length. With these dimensions and this rupture elongation, it is assured that the cartridge has, on the one hand, an adequate strength to be handled easily and safely without having to fear that said cartridge will burst accidentally and spill its contents. On the other hand, the strength of the material of the cartridge is only precisely of such a magnitude that it can be reliably comminuted in the course of the rotary blow-type placement of the anchoring means, for example, an anchor rod.

Cartridge, which can be manufactured with particular ease, comprise two compartments connected with one another, which are preferably blow molded or deep drawn from the foil. Polyamide, polyvinyl chloride, Polyester and/or mixtures of these materials or paper with sealable polymers can be used as foil materials. The sealing seams of the cartridge have a width of in between 5% and 50% of the mixture external diameter. On the one hand a sufficient solidity or endurance of the sealing seams is provided with these widths, on the other hand the sealing seams interfere only slightly with the comminution of the cartridge in the course of rotary blow-type placement of the anchoring means.

The inventive mortar mixture includes filling materials and binders. Inorganic and organic binders or mixtures thereof can be utilized. The binder comprises preferably at least two reaction components, which are essentially disposed across the entire length of the mixture package. Those substances are designated as being on the one hand reaction components, which react during the hardening reaction into binder molecules. On the other hand, the reaction components can also be substances which make possible the hardening reaction by their presence or their own reaction, even initiating, accelerating, inhibiting or catalyzing the same.

As an example, a combination of reactive resin mixtures and hardeners in organic systems are named, where the hardener indeed initiates the polymerization but itself does not participate in the reaction. Such binders are known from the state of the art and have been tested in specialized industrial use. The distribution of the reaction components essentially across the entire length of the cartridge supports the homogeneous intermixture of the reaction components, in order to assure a very thorough and complete hardening or curing of the binders.

In a preferred variant of the invented mortar mixture unit, one of the reaction components is preferably fixed upon fiber reinforced tissue—or fleece carriers, which are worked into the material of the cartridge in such a way that the reaction component fixed thereon comes into contact with the second reaction component only upon destruction of the cartridge. The two reaction components are present in a separated state up to the intended destruction of the cartridge. An unintentional intermixing of the two reaction components is to all intents and purposes impossible. In this way it is assured that the multi-component mortar cures or hardens only in the borehole after introduction of the anchoring means.

In another particularly advantageous embodiment variant of the inventive mortar mixture unit, one of the reaction components together with inert auxiliary substances is combined into particle shaped agglomerates, which have a density of about 60% to about 120% of the density of the filler materials and an equivalent diameter corresponding to approximately 0.5 times to approximately 0.4 times the equivalent diameter of the majority of the filling material particles. The agglomerates are embedded directly into the second reaction component wherein they are separated from one another by a coating which is inert relative to the reaction components. It is assured by the selected density and the fixed equivalent diameter of the agglomerate that said agglomerates are arranged stationarily within the mortar mixture unit and do not collect at one end of the cartridge due to handling of the mortar mixture. The density and the equivalent diameter of the agglomerates are selected precisely in such a way that they cannot sink to the bottom of the fillers due to gravity and also cannot float to the top in the second reaction component of the binder. The separation of the reaction components of the binder is achieved by a coating which is inert relative to both components.

In an advantageous embodiment variant of the invention, the inert auxiliary substances form an ingredient of the filling materials and in this way also assume in the hardened or cured multi component mortar the supporting/reinforcing functions. Glass, ceramics, high strength polymers etc. can be used for this purpose as inert auxiliary substances.

In a preferred embodiment variant of the inventive mortar mixture unit, the reaction components of the binder include a vinyl esterurethane resin and an accompanying hardener, wherein the volume share of resin and hardener together amount to approximately 25% to approximately 55% and the filler agent share approximately 40% to approximately 70% of the total volume of the mortar mixture. This organic system and advantageous refinements thereof are described in the DE-A-41 11 828.

In an advantageous variant of the invention, the binder includes an inorganic system of reaction components, wherein the reaction components are, in the presence of water, curable and hardenable masses and comprise (a) mixtures containing finely divided $SiO_2$ or finely divided $SiO_2$ together with $Al_2O_3$;

(b) at least partially water soluble alkali silicates and/or ammonia silicates and/or alkali-oxides or hydroxides and amorphously dispersed silicic acid in powder form as alkali silicate-precursors, (c) such inorganic and/or organometallic compounds, which have an intense heating effect upon contact with water which accelerates hardening of the mass and (d) optionally foaming or sponging agents or the like.

Such an inorganic binding means and advantageous refinements thereof are the subject of the U.S. Pat. No. 5,228,913.

BRIEF DESCRIPTION OF THE DRAWINGS

In the following, the invention is described with particularity with all of its essential associated details with the help of embodiment examples shown in diagrammatic drawings. It is understood that these examples are provided by way of illustration and not by way of limitation. It is shown on:

FIG. 1 A first embodiment example of the inventive mortar mixture unit partially in longitudinal section, FIG. 2 A cross section through the mortar mixture unit in FIG. 1 taken along line II—II, and FIG. 3 A second embodiment example of the invented mortar mixture unit.

Figure 3:
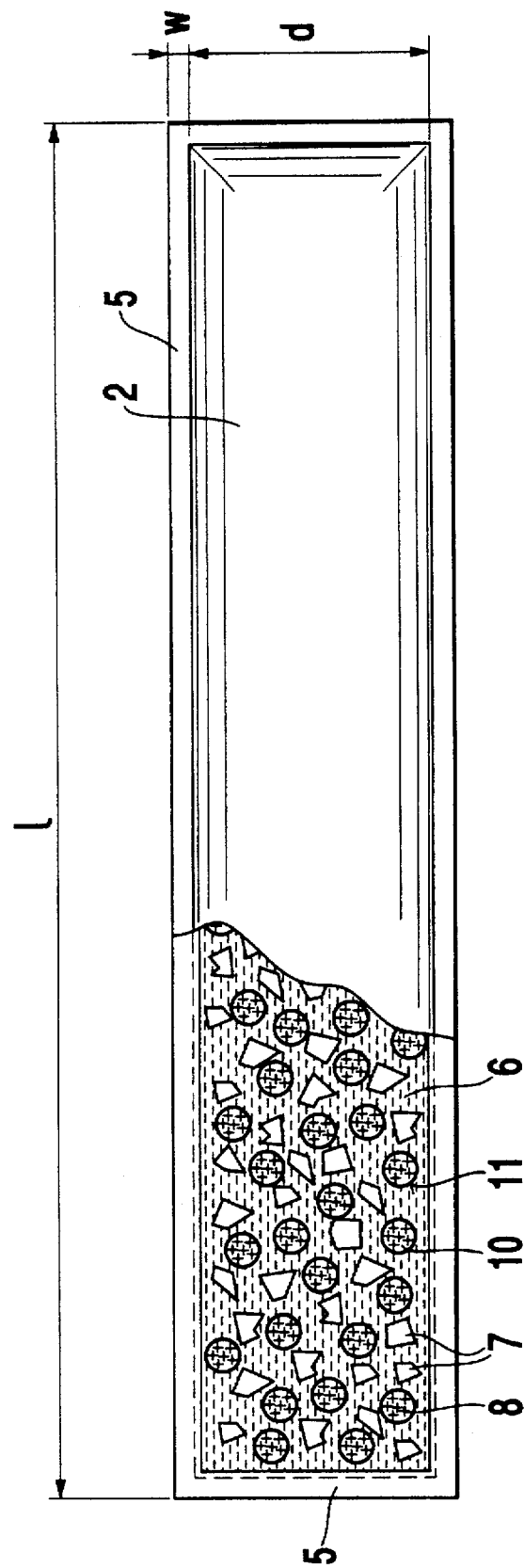

A first embodiment example of the inventive mortar mixture unit 1 is diagrammatically depicted in FIGS. 1 and 2. The mortar mixture unit 1 comprises an approximately cylindrical cartridge 2 having an external diameter d fabricated from a flexible foil or a foil composite 3, 4. Foil materials could be polymide, polyvinyl chloride, polyacrylonitrile, polyester and/or composites from these materials or of paper provided with sealable polymers. The foil composite 3, 4 is sealed in a liquid tight manner at the ends and on the longitudinal side. Herein the sealing seams 5 have a width of w, which lies between 5% and 50% of the unit's external diameter d. The wall thickness t of the foil composite 3, 4 amounts to approximately 0.1% to about 3% of the external diameter d of the mortar mixture unit 1. The foil composite has a fracture elongation of less than 300% of the original foil length. The volume share of the material 3, 4 of the cartridge amounts to less than 15% of the total volume of the mortar mixture unit. Binder means 6, 8 and filling material or agents 7, are disposed within the cartridge 2. The volume share of the binder means 6, 8 amounts to approximately 15% to about 60% and that of the filling material amounts to approximately 35% to about 70% of the total volume of the mortar mixture unit 1.

The binder system comprises at least two reaction components 6 or 8. One of the reaction components 8 is preferably fixed upon fiber reinforced tissue—or fleece carriers 9. The preferably fiber reinforced tissue—or fleece carriers 9 are disposed between the individual layers 3 or 4 of the foil composite and extend approximately over the total length of the cartridge 2. In this way, the two reaction components 6, 8 are separated from one another and only come in to contact with one another when the cartridge 2 is destroyed upon the rotary blow placement of an anchoring member.

The binder agent 6, 8 can comprise an inorganic or an organic system or also a mixture of inorganic and organic systems. As an inorganic system, the reaction components comprise masses which are curable or hardenable in the presence of water and are based on (a) mixtures containing finely divided $SiO_2$ or finely divided $SiO_2$ together with $Al_2O_3$, (b) at least partially soluble in water alkali silicates and/or ammonia silicates and/or alkali-oxides or -hydroxides and amorphously dispersed powder shaped silicic acid as alkalisilicate—precursors, (c) such inorganic and/or organo metallic compounds, which have an intense heat effect or heat of reaction upon contact with water which accelerates hardening of the mass and (d) foaming or sponging agents and the like.

Such an inorganic binder agent and advantageous refinements thereof are the subject of the U.S. Pat. No. 5,228,913.

As organic systems, preferred reaction components comprise a vinylesterurethane resin and an associated hardener, wherein the volume share of resin and hardener together amount to approximately 25% to approximately 55% and the filler material share to approximately 40% to approximately 70% of the total volume of the mortar mixture unit 1. This organic system and advantageous refinements thereof are described in the DE-A-41 11 828.

It goes without saying that when dealing with mixtures of organic and inorganic systems as binders 6, 8, the volume relationships of the reaction partners must be appropriately adapted or matched. Overall, however, the volume relationships of the binder means 6, 8 of the filling agent 7 and of the material 3, 4 of the cartridge 2 are, however, maintained.

The filling agents 7 are preferably coarsely dispersed materials, which are largely inert with respect to the binders 6, 8, while having a hardness on the Mohs scale of more than 4 and a density of more than or equal to 2 g/cm³. The filling agents 7 have a granular and angular particle shape. At least 80% by weight of the filler agent particles have an equivalent diameter, which amounts to approximately 5% to approximately 25% of the external diameter d of the mortar mixture unit 1. The diameter of a ball of equivalent volume is viewed as an equivalent diameter of an irregularly shaped filling agent particle.

In the second embodiment example of the inventive mortar mixture unit 1 depicted diagrammatically in FIG. 3, the cartridge 2 comprises two inter-connected compartments which preferably are deep-drawn from the foil material. The two half compartments are inter-connected along the sealed region 5 in a liquid tight manner. One of the reaction components 8 together with the inert auxiliary substances is combined to form particle-shaped agglomerates 10, which have a density of approximately 60% to approximately 120% of the density of the filler agent 7 and also have an equivalent diameter amounting to approximately 0.5 to approximately 4 times the equivalent diameter of the greater part of the filler agent particles. The agglomerates 10 are directly embedded into the second reaction component 6, wherein they are separated from one another by a coating 11 which is inert relative to the reaction components 6, 8. It is assured by the selected density and fixed equivalent diameter of the agglomerates 10, that the agglomerates 10 are stationarily disposed within the mortar mixture unit 1 and do not collect at one end of the container when operating or handling the mortar mixture unit 1. The density and the equivalent diameter of the agglomerates 10 are herein selected in such a way that they do not settle in the filling agent 7 under the effect of gravity and that they can also not float to the top in the second reaction component 6 of the binder agent.

The separation of the reaction component 6, 8 of the binder means is achieved by a coating 11 which is inert relative to both components. Glass, ceramics, high strength polymers etc. can, for instance, be used as inert auxiliary substances. In this case, the inert auxiliary materials are an ingredient of the filler agent 7 initially and assume supportive and reinforcing functions in the hardened multi-component mortar. Chalk, gypsum, alkaline-earth-metallic-oxides, emollients or softening agents on the basis of polymer-dicarboxylicacid-ester or the like can also be used as inert auxiliary substances.

In an alternative embodiment variant of the invention, the mortar mixture unit can also comprise two or possibly even several elongated foil bags which are disposed inside one another and/or parallel to one another. The individual reaction components are kept separately from one another in the foil bags up to the time of destruction of said foil bags when setting the mortar mixture unit. The filling materials are contained in one of the bags or are distributed among several bags.

The inventive design of the mortar mixture unit assures a very good connection between the anchoring means to be attached and the borehole wall. The mortar mixture unit can be handled without any problems due to the flexibility of the material of the cartridge. The cartridge is sufficiently stable in order to reliably restrain the vinyl means and the filling agent, without having to take special measures in its storage or during the transportation process. It is largely insensitive to shocks and also does not break up, even if it is inadvertently dropped on the floor. In spite of this, the cartridge is relatively easy to destroy and to comminute in the course of the rotary blow placement of an anchoring member, for instance an anchor rod, a sleeve provided with internal thread, or a concrete reinforcing iron.

Herein the low volume share of the material of the cartridge of less than 15% of the overall volume of the mortar mixture unit assures that the comminuted cartridge does not have a negative effect upon the load carrying capacity of the anchoring. The volume share of the binder means amounts to approximately 15% to about 60% and that of the filling agent to about 35% to about 70% of the total volume of the mortar mixture unit. Due to the selected volume relationship, a sufficiently high setting resistance is assured in the course of the rotary blow placement of the anchoring member. The entire filling agent can be predetermined in as far as its properties and nature are concerned; the comminuted cartridge itself is not an ingredient of the filling agent. Thereby the setting resistance can be controlled in a targeted manner in order to obtain a thorough intermixture of the individual component of the multi-component mortar, in particular of the reaction components of the binder means.

The thorough intermixture together with the only slight volume share of the flexible and destructible material of the cartridge has the effect that the ingredients of the cartridge are distributed very uniformly in the mortar. Due to the circumstance; that the properties and the nature of the entire filling agent can be essentially predetermined said filling agent can also be matched to the properties of the materials of the cartridge, for instance, to assist in comminuting same during the rotary blow placement of the anchoring means. The entire filling agent can be matched to the binder means used and can be targeted to the desired strength of the hardened mortar. In this way as good a connection as possible is assured between the anchoring means to be attached and the borehole wall.

What is claimed is:

1. A mortar mixture unit for chemical attachment of an anchoring member within a borehole, comprising an elongated cylindrical external cartridge (2) having an external diameter (d) and a length (1), and being destructible upon inserting the anchoring member into the borehole containing said cartridge, said cartridge contains a multi-component mortar, said multi-component mortar comprises a binder means (6, 8) and filling agents (7), said binder means comprises at least two reaction components maintained separated within said cartridge (2) until said anchoring member destroys said cartridge, the cartridge (2) is formed of a flexible material (3, 4) having a volume share amounting to less than 15% of a total volume of the mortar mixture unit (1), the binder means (6, 8) having a volume share amounting to approximately 15% to 60% of the total volume of the mortar mixture unit, and the filling agent (7) having a volume share of approximately 35% to 70% of the total volume of the mortar mixture unit (1).

2. The unit according to claim 1, wherein the filling agents (7) are dispersed coarse materials largely inert with respect to the binder means (6, 8) and having a hardness on the Mohs scale of more than 4 and a density of more than or equal to 2 g/cm$^3$ and a granular and angular particle shape, at least 80% by weight of the filling agents have an equivalent diameter which amounts to approximately 5% to 25% of the external diameter d of the mortar mixture unit (1).

3. The unit according to claim 1 or 2, wherein the cartridge (2) has a wall thickness (t) amounting to approximately 0.1% to 3% of the external diameter (d), the cartridge (2) is formed of foils (3, 4) having a fracture or tear elongation of less than 300% of the original length of the foils.

4. The unit according to claim 3, wherein the wall thickness (t) of the cartridge (2) comprises two layers (3, 4) shaded to form at least two separate compartments formed by one of deep drawing and blow-molding.

5. The unit according to claim 4, wherein the binder means (6, 8) is one of an organic system, an inorganic system and a mixture thereof, essentially disposed over the entire length (1) of the cartridge (2).

6. The unit according to claim 5, wherein one of the reaction components (8) is fixed upon fiber-reinforced tissue or fleece-carriers (9) embedded or worked into in such a way between the layers (3, 4) of the cartridge (2), so that said reaction components (8) fixed thereon come into contact with the other reaction component (6) only upon destruction of the cartridge (2).

7. The unit according to claim 5, wherein said binder means comprises a first reaction component and a second reaction component said first reaction component (8) together with an inert auxiliary substance are interconnected and form particle-shaped agglomerates (10) having a density of about 60% to 120% of the density of the filling agent (7) and an equivalent diameter amounting to approximately 0.5 times to 4 times of the equivalent diameter of most of the filling agent particles, and the agglomerates being directly embedded within the second reaction component (6) and being separated from one another by a coating (11) which is inert relative to the first and second reaction components (6, 8).

8. The unit according to claim 7, wherein the inert auxiliary substances are ingredients of the filling agent (7).

9. The unit according to claim 7, wherein the reaction component (8) comprises a vinylesterurethane resin and the second reaction component (6) comprises an associated hardener, and the volume of the resin and hardener together amount to approximately 25% to 55% of the total volume of the mortar mixture unit and the filling agent (7) share amounts to approximately 40% to 70% of the total volume of the mortar mixture unit (1).

10. The unit according to claim 7, wherein the binder means (6, 8) comprises an inorganic system of reaction components curable or hardenable in the presence of water and comprise:

(a) mixtures containing one of finely divided $SiO_2$ and finely divided $SiO_2$ together with $Al_2O_3$, (b) at least one of at least partially water-soluble alkali silicates, ammonia silicates alkalioxides, and alkali-hydroxides and amorphously dispersed silicic acid as alkali silicate-precursors, (c) inorganic, metallo-organic compounds having an intense heat of reaction upon contact with water for accelerating hardening of the binder means (6, 8), and optionally foaming or sponging agents.

* * * * *

UNITED STATES PATENT AND TRADEMARK OFFICE
CERTIFICATE OF CORRECTION

PATENT NO.    : 5,730,557
DATED         : March 24, 1998
INVENTOR(S)   : Roman Skupien, et al It is certified that error appears in the above-identified patent and that said Letters Patent is hereby corrected as shown below:

On the title page, item
[75] Inventors: Roman Skupien, Schwabmunchen; Erich Leibhard, Munich; Lutz Achim Sager, Landsberg, all of Germany Signed and Sealed this Twenty-sixth Day of May, 1998

Attest:

BRUCE LEHMAN

Attesting Officer        Commissioner of Patents and Trademarks